United States Patent
Nam et al.

(10) Patent No.: US 9,990,755 B2
(45) Date of Patent: Jun. 5, 2018

(54) APPARATUS AND METHOD FOR PROCESSING ANIMATION

(71) Applicant: SAMSUNG ELECTRONICS CO., LTD., Suwon-si, Gyeonggi-do (KR)

(72) Inventors: Ki-hoon Nam, Suwon-si (KR); In-ho Kye, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 13 days.

(21) Appl. No.: 14/940,213

(22) Filed: Nov. 13, 2015

(65) Prior Publication Data
US 2016/0232699 A1     Aug. 11, 2016

(30) Foreign Application Priority Data

Feb. 9, 2015    (KR) ................. 10-2015-0019661

(51) Int. Cl.
| | |
|---|---|
| *G06T 13/00* | (2011.01) |
| *G06T 13/80* | (2011.01) |
| *G06T 1/20* | (2006.01) |
| *G06T 1/60* | (2006.01) |

(52) U.S. Cl.
CPC ............. *G06T 13/80* (2013.01); *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 7,669,141 B1 | 2/2010 | Pegg | |
| 8,610,724 B2 | 12/2013 | Garg | |
| 2002/0029285 A1* | 3/2002 | Collins | G06F 3/1454 709/232 |
| 2009/0066702 A1 | 3/2009 | Dion et al. | |
| 2012/0229460 A1* | 9/2012 | Fortin | G06T 1/20 345/419 |
| 2014/0229865 A1* | 8/2014 | Da Costa | G06F 3/04815 715/757 |

FOREIGN PATENT DOCUMENTS

EP     1 862 973     12/2007

OTHER PUBLICATIONS

European Search Report dated Jun. 29, 2016 in corresponding European Application No. 15 195 191.
Office Action dated Jul. 25, 2016 in corresponding European Patent Application No. 15 195 191.
Funkhouser T A et al.: "Adaptive Display Algorithm for Interactive Frame Rates During Visualization of Complex Virtual Environments", SIGGRAPH Conference Proceddings, XX, XX, Jan. 1, 1993 (Jan. 1, 1993), pp. 247-254, XP001008529.

* cited by examiner

*Primary Examiner* — Mohammad H Akhavannik
(74) *Attorney, Agent, or Firm* — Staas & Halsey

(57) ABSTRACT

An apparatus for processing an animation includes an object storage unit configured to store objects included in animation content and an animation control unit configured to adjust at least one of a number of objects to be rendered in one frame among the objects included in the animation content and preset target frames per second (FPS) by calculating a rendering time of the objects to be rendered in one frame and comparing the rendering time with the target FPS.

13 Claims, 6 Drawing Sheets

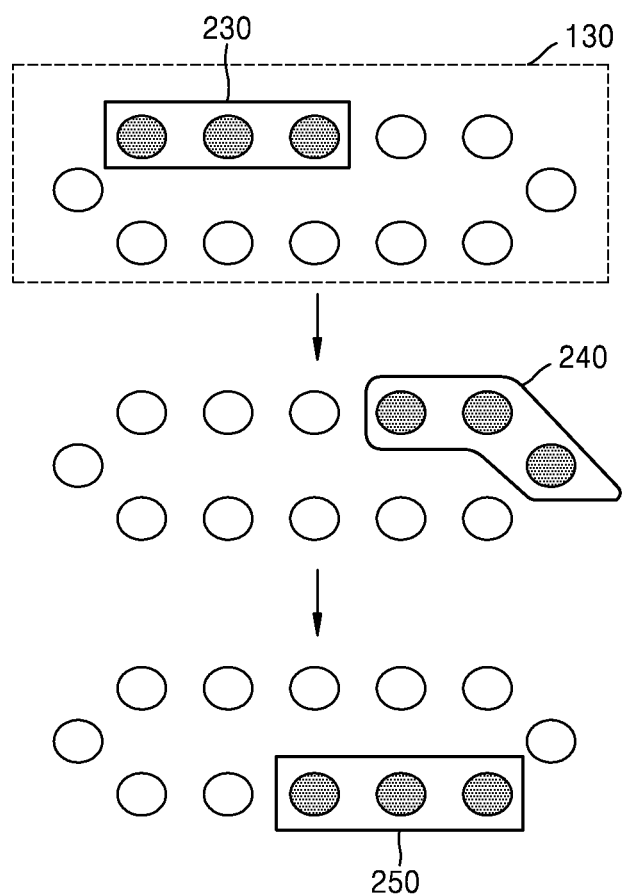

APPARATUS AND METHOD FOR PROCESSING ANIMATION

CROSS-REFERENCE TO RELATED APPLICATIONS

This application claims the benefit of Korean Patent Application No. 10-2015-0019661, filed on Feb. 9, 2015, in the Korean Intellectual Property Office, the disclosure of which is incorporated herein in its entirety by reference.

BACKGROUND

1. Field

The present disclosure relates to apparatuses and methods for processing an animation, and more particularly, to apparatuses and methods for processing an animation, whereby the frames per second (FPS) of the animation and the number of objects to be rendered in one frame may be heuristically adjusted.

2. Description of the Related Art

A webpage is a document created using hypertext markup language (HTML) and may include not only text but also various pieces of web content such as an image, a video, an audio, and the like in the body thereof. The pieces of web content in the webpage are properly respectively arranged using HTML according to tags related to a layout. At the beginning, HTML was used to make only static webpages. However, recently, HTML has been extended to make dynamic webpages by utilizing techniques such as Java scripts and cascading style sheets (CSSs).

In general, a process by which a web browser based on a web engine displays a webpage on a screen is as follows. First, the web browser reads an HTML document to load necessary resources. Next, the web engine parses the loaded resources to make a document object model (DOM) tree and a render tree. Finally, the web engine creates a webpage by performing a layout operation based on the render tree and a painting operation on each piece of web content included in the HTML document and displays the created webpage on the screen.

SUMMARY

Provided are apparatuses and methods capable of improving the quality of an animation by heuristically adjusting the frames per second (FPS) of the animation and the number of objects to be rendered in one frame.

Additional aspects will be set forth in part in the description which follows and, in part, will be apparent from the description, or may be learned by practice of the presented exemplary embodiments.

According to an aspect of an exemplary embodiment, an apparatus for processing an animation includes: an object storage unit configured to store objects included in animation content; and an animation control unit configured to adjust at least one of a number of objects to be rendered in one frame among the objects included in the animation content and preset target frames per second (FPS) by calculating a rendering time of the objects to be rendered in one frame and comparing the rendering time with the target FPS.

The animation control unit may be further configured to decrease the number of objects to be rendered in one frame if a time obtained by summing respective rendering times of the objects to be rendered in one frame is greater than a target time corresponding to the target FPS and the number of objects to be rendered in one frame is equal to or greater than a preset number.

The animation control unit may be further configured to decrease the target FPS if a time obtained by summing respective rendering times of the objects to be rendered in one frame is greater than a target time corresponding to the target FPS and the number of objects to be rendered in one frame is less than a preset number.

The animation control unit may be further configured to increase the number of objects to be rendered in one frame if a time obtained by summing respective rendering times of the objects to be rendered in one frame is less than a target time corresponding to the target FPS.

The object storage unit may be further configured to store the objects in a circular queue form.

The animation control unit may be further configured to control the object storage unit to set a window to sequentially include a preset number of the objects stored in the object storage unit.

The objects included in the window may be the objects to be rendered in one frame.

The animation control unit may measure a matrix calculation time for rendering with respect to each of the objects and determine the measured time as a rendering time for each of the objects.

The apparatus may further include a network interface unit configured to receive the animation content.

The apparatus may further include a display unit configured to display a frame generated by rendering the objects included in the window.

According to an aspect of another exemplary embodiment, a method of processing an animation includes: calculating a rendering time of objects to be rendered in one frame among objects included in animation content; comparing the rendering time with preset target frames per second (FPS); and adjusting at least one of a number of the objects to be rendered in one frame and the target FPS.

The adjusting of the at least one of the number of objects to be rendered in one frame and the target FPS may include decreasing the number of objects to be rendered in one frame if a time obtained by summing respective rendering times of the objects to be rendered in one frame is greater than a target time corresponding to the target FPS and the number of objects to be rendered in one frame is equal to or greater than a preset number.

The adjusting of the at least one of the number of objects to be rendered in one frame and the target FPS may include decreasing the target FPS if a time obtained by summing respective rendering times of the objects to be rendered in one frame is greater than a target time corresponding to the target FPS and the number of objects to be rendered in one frame is less than a preset number.

The adjusting of the at least one of the number of objects to be rendered in one frame and the target FPS may include increasing the number of objects to be rendered in one frame if a time obtained by summing respective rendering times of the objects to be rendered in one frame is less than a target time corresponding to the target FPS.

The method may further include storing the objects included in the animation content, in a circular queue form.

The method may further include setting a window to sequentially include a preset number of the stored objects, wherein the objects included in the window are the objects to be rendered in one frame.

The method may further include displaying a frame generated by rendering the objects included in the window.

The calculating of the rendering time of the objects to be rendered in one frame may include measuring a matrix calculation time for rendering each of the objects and determining the measured time as a rendering time of each of the objects.

The method may further include receiving the animation content.

According to an aspect of another exemplary embodiment, an animation processing method may include comparing a calculated rendering time for animation objects to be rendered in a single frame with a target rendering time that corresponds to a target quantity of frames per second, and increasing a quantity of the animation objects to be rendered in the single frame when, according to a result of the comparing, the quantity of the animation objects to be rendered in the single frame can be increased without exceeding the target rendering time.

BRIEF DESCRIPTION OF THE DRAWINGS

These and/or other aspects will become apparent and more readily appreciated from the following description of the exemplary embodiments, taken in conjunction with the accompanying drawings in which:

FIG. 2 illustrates an object storage unit in the apparatus of FIG. 1;

DETAILED DESCRIPTION

Figure 1:
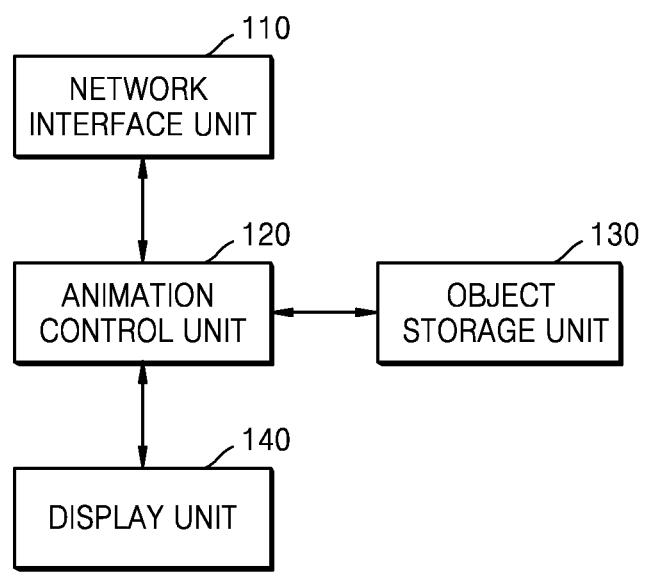
FIG. 1 illustrates a block diagram of an apparatus for processing an animation, according to an exemplary embodiment of the inventive concept.

The terms used in the specification will be briefly described, and then, the inventive concept will be described in detail.

Although general current terms have been used to describe the inventive concept based on the functions in the inventive concept, the terms may vary according to the intention of one of ordinary skill in the art, case precedents, and the appearance of new technology. In addition, in specific situations, terms selected by the applicant may be used, and in these situations, the meaning of these terms will be disclosed in corresponding descriptions of the specification. Accordingly, the terms used in the specification to describe the inventive concept are defined not by their simple names but by their meanings in the context of the inventive concept.

In the specification, when a certain part "includes" a certain component, this indicates that the part may further include another component instead of excluding the other component unless there is different disclosure. In addition, a term such as " . . . unit" or "module" disclosed in the specification indicates a unit for processing at least one function or operation, which may be implemented by hardware, software, or a combination thereof.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. In the drawings, parts irrelevant to the description are omitted to clearly describe the inventive concept. Accordingly, the exemplary embodiments are merely described below, by referring to the figures, to explain aspects thereof.

As used herein, expressions such as "at least one of," when preceding a list of elements, modify the entire list of elements and do not modify the individual elements of the list.

FIG. 1 illustrates a block diagram of an apparatus 100 for processing an animation, according to an exemplary embodiment of the inventive concept.

According to an exemplary embodiment, the apparatus 100 may be implemented as one of various electronic devices such as a TV, a cellular phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation, an MP3 player, a wearable device, and the like but is not limited thereto.

Referring to FIG. 1, the apparatus 100 may include, for example, a network interface unit 110, an animation control unit 120, an object storage unit 130, and a display unit 140.

The network interface unit 110 may provide an interface for connecting the apparatus 100 to a wired/wireless network such as the Internet. For example, the network interface unit 110 may receive, over a network, content or data provided by an Internet or content provider or a network operator.

In addition, the network interface unit 110 may access the Internet to receive an HTML document and to deliver the received HTML document to the animation control unit 120. The HTML document may include content. The content may indicate various kinds of data provided through the Internet, computer communication, or the like and may include web content. The web content may include a text, an image, an icon, a thumbnail, a video, or a combination thereof, and the like as elements of the HTML document. In addition, if the content includes a motion, the motion of the content or a function of performing the motion of the content may be referred to as an animation. In addition, if the content includes a motion, the content may be referred to as animation content.

The animation control unit 120 may determine objects of the animation from the web content included in the received HTML document. In addition, the animation control unit 120 may store the determined objects in the object storage unit 130.

FIG. 2 illustrates the object storage unit 130 of FIG. 1.

Referring to FIG. 2, the object storage unit 130 may store objects in a circular queue form. The circular queue is a type of a data structure and indicates a queue in which data stored therein is circulated.

In addition, a window 230 may be set in the circular queue, and the window 230 may move so that the objects stored in the circular queue form are sequentially included in the window 230. In this case, all objects included in the window 230 at one time may be rendered in one frame.

For example, as shown in FIG. 2, when a size of the window 230 is 3, the window 230 may include three objects, and the animation control unit 120 may control the first to third objects to be rendered in a first frame. After rendering of the first frame is completed, the animation control unit 120 may move the window 230 to render a next frame (a second frame) after the first frame. A moved window 240 may include fourth to sixth objects. After rendering of the second frame is completed, the animation control unit 120 may move the window 240 to render a next frame (a third frame) after the second frame. A moved window 250 may include seventh to ninth objects.

The animation control unit 120 may calculate a rendering time of objects included in a current window. In this case, the rendering time of the objects may include a time of transmitting a rendering execution command from the animation control unit 120 to a rendering module (not shown) and a time of calculating coordinates, matrices, and the like of the objects to be rendered. The animation control unit 120 may measure a time of calculating a matrix of each of the objects and set the measured time as a rendering time of each of the objects.

For example, the animation control unit 120 may calculate a rendering time of each of the objects by measuring, using a performance function, a rendering start time point of the objects included in the current window and an end time point of a matrix calculation of each of the objects.

In addition, the matrix of each of the objects may be calculated using an animation parameter of each of the objects. The animation parameter may indicate how many pixels are moved by an object, how much the object is magnified or reduced, or the like.

The animation control unit 120 may compare the rendering time of the objects included in the current window with target frames per second (FPS). For example, the animation control unit 120 may compare the rendering time of the objects with a target time corresponding to the target FPS. In this case, the target time may be calculated as a reciprocal of the target FPS. For example, if the target FPS is 60, the target time may be about 16 ms.

As a comparison result, if the rendering time of the objects included in the current window is greater than the target time, the animation control unit 120 may determine whether the number of objects included in the current window is equal to or greater than a preset number. In this case, the preset number may be set by taking into account the total number of objects included in the content.

If the number of objects included in the current window is equal to or greater than the preset number, the animation control unit 120 may adjust the size of the current window. For example, the size of the current window may indicate the number of objects included in the current window, and the animation control unit 120 may adjust the size of the current window to adjust the number of objects included therein. That is, the animation control unit 120 may adjust the size of the current window to decrease the number of objects included in the current window.

If the number of objects included in the current window is less than the preset number, the animation control unit 120 may decrease the target FPS. When the target FPS is decreased, the target time increases, and accordingly, the rendering time of the objects included in the current window may be equal to or less than the adjusted target time.

Otherwise, as a comparison result, if the rendering time of the objects included in the current window is equal to or less than the target time, the animation control unit 120 may increase the size of the current window to increase the number of objects included in the current window.

Although not shown, the apparatus 100 may further include a rendering module. The rendering module may receive a rendering execution command from the animation control unit 120 and may render objects. The rendering module may render, in one frame, objects included in one window.

When the objects included in the current window are rendered, the animation control unit 120 may move the current window so that the current window includes next objects stored in the circular queue.

According to an exemplary embodiment, the animation control unit 120 may control objects having a higher importance than other objects, among the objects included in the content to be stored, in a separate circular queue in order to increase a rendering frequency compared with that of the other objects. For example, the animation control unit 120 may control objects having a smaller importance than a preset value to be stored in a first circular queue and control objects having an importance equal to or greater than the preset value to be separately stored in a second circular queue. In this case, the animation control unit 120 may separately control the first circular queue and the second circular queue so that a rendering frequency of the important objects stored in the second circular queue is greater than that of the objects stored in the first circular queue. For example, the important objects stored in the second circular queue may be rendered for each frame.

The display unit 140 may display a rendered frame. The display unit 140 may be implemented as a plasma display panel (PDP), a liquid crystal display (LCD), an organic light-emitting display (OLED), a flexible display, a three-dimensional (3D) display, or the like. In addition, the display unit 140 may be configured to include a touch screen to be used as an input device in addition to being used as an output device.

The block diagram of the apparatus 100 shown in FIG. 1 is only illustrative. Each component in the block diagram may be integrated, added, or omitted according to a specification of the apparatus 100 to be actually implemented. That is, according to circumstances, two or more components may be integrated into one component, or one component may be separated into two or more components. In addition, the function performed by each block is described in the exemplary embodiments, and a detailed operation or device of each block does not limit the right scope of the inventive concept.

FIGS. 3A to 3D are reference diagrams for describing a method of processing an animation, according to an exemplary embodiment of the inventive concept.

Figure 3A:
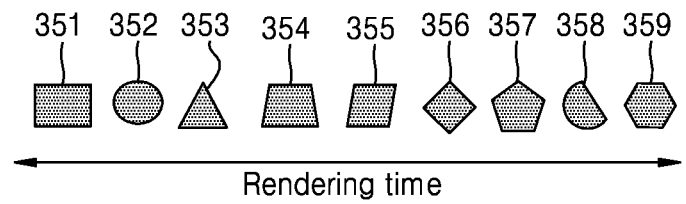
FIGS. 3A, 3B, 3C, and 3D are reference diagrams for describing a method of processing an animation, according to an exemplary embodiment of the inventive concept.

Referring to FIG. 3A, the animation may include first to ninth objects 351 to 359. In this case, when all of the objects (the first to the ninth objects 351 to 359) included in the animation are rendered for each frame, a rendering time is greater than a target time corresponding to target FPS, and thus, all of the objects cannot be rendered within the target time. Accordingly, a frame skip occurs, and in this case, the target FPS decrease, and thus, the performance and the quality of the animation is deteriorated.

According to an exemplary embodiment, the animation control unit 120 may calculate a time of rendering the objects stored in the object storage unit 130. The animation control unit 120 may measure a time of calculating a matrix of each of the objects and set the measured time as a rendering time. The animation control unit 120 may adjust the size of a window (the number of objects to be rendered in one frame) based on preset target FPS and a rendering time of each of the objects.

For example, if the target FPS is set to 60 and accordingly the target time is set to be about 16 ms, the animation control unit 120 may adjust the size of the window (the number of objects to be rendered in one frame) so that a time obtained by summing respective rendering times of the objects to be rendered in one frame is 16 ms or less.

Figure 3B:
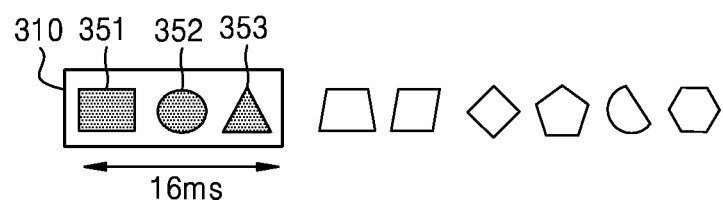

When a rendering time of the first object 351 is calculated to be 4 ms, a rendering time of the second object 352 is calculated to be 8 ms, a rendering time of the third object 353 is calculated to be 4 ms, and a rendering time of the fourth object 354 is calculated to be 7 ms, the animation control unit 120 may control the first, second, and third objects 351, 352, and 353 to be rendered in a first frame as shown in FIG. 3B so that the target FPS (e.g., 60) is satisfied. In this case, the size of a window 310 may be 3.

After rendering of the first frame is completed, the window 310 may move to include the fourth, fifth, and sixth objects 354, 355, and 356. However, a rendering time of the fourth object 354 may be calculated to be 7 ms, a rendering time of the fifth object 355 may be calculated to be 7 ms, and a rendering time of the sixth object 356 may be calculated to be 6 ms. In this case, a time (20 ms (=7 ms+7 ms+6 ms)) obtained by summing the respective rendering times of the fourth, fifth, and sixth objects 354, 355, and 356 is greater than the target time (16 ms).

Figure 3C:
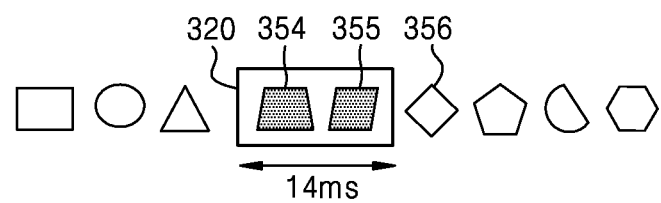

Accordingly, as shown in FIG. 3C, the animation control unit 120 may decrease the size of a window 320 (the number of objects included in the window 320) to 2. In addition, the animation control unit 120 may control the fourth and fifth objects 354 and 355 to be rendered in a second frame.

After rendering of the second frame is completed, the window 320 may move to include the sixth and seventh objects 356 and 357. However, a rendering time of the sixth object 356 may be calculated to be 6 ms, and a rendering time of the seventh object 357 may be calculated to be 5 ms. In this case, a time (11 ms (=6 ms+5 ms)) obtained by summing the respective rendering times of the sixth and seventh objects 356 and 357 is less than the target time (16 ms).

Figure 3D:
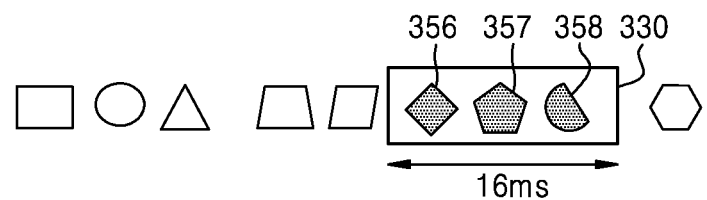

Accordingly, as shown in FIG. 3D, the animation control unit 120 may increase the size of a window 330 (the number of objects included in the window 330) to 3. When the size of the window 330 increases to 3, the eighth object 358 is included in the window 330. A rendering time of the eighth object 358 is calculated to be 5 ms, and a time (16 ms) obtained by summing the respective rendering times of the sixth, seventh, and eighth objects 356, 357, and 358 is equal to the target time (16 ms).

The animation control unit 120 may control the sixth, seventh, and eighth objects 356, 357, and 358 to be rendered in a third frame.

Figure 4A:
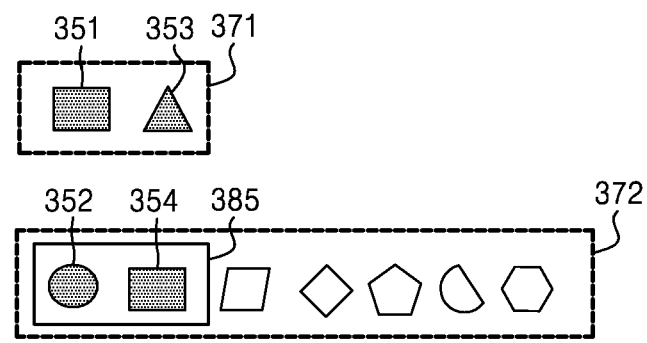
FIGS. 4A and 4B are reference diagrams for describing a method of processing an animation, according to another exemplary embodiment of the inventive concept.
Figure 4B:
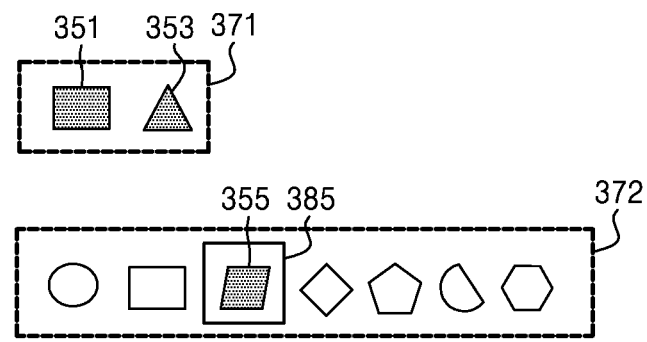

FIGS. 4A and 4B are reference diagrams for describing a method of processing an animation, according to another exemplary embodiment of the inventive concept.

According to an exemplary embodiment, the animation control unit 120 may control objects having a higher importance than other objects among objects included in content to be stored in a separate circular queue in order to increase a rendering frequency of the objects having the higher importance compared with that of the other objects. For example, referring to FIG. 4A, the animation control unit 120 may control the first and third objects 351 and 353 having an importance equal to or greater than a preset value to be stored in a first circular queue 371 and control the second and fourth to ninth objects 352 and 354 to 359 having a smaller importance than the preset value to be stored in a second circular queue 372. In this case, the animation control unit 120 may separately control the first circular queue 371 and the second circular queue 372. The animation control unit 120 may control target FPS of the second circular queue 372 so that the important objects stored in the first circular queue 371 are rendered for each frame. Alternatively, the animation control unit 120 may adjust a size of a window 385 of the second circular queue 372 so that a time obtained by summing respective rendering times of objects to be rendered in one frame among the objects stored in the second circular queue 372 is equal to or less than a target time of the second circular queue 372.

For example, referring to FIG. 4A, the animation control unit 120 may control the first and third objects 351 and 353 stored in the first circular queue 371 and the second and fourth objects 352 and 354 stored in the second circular queue 372 to be rendered in a first frame. In addition, referring to FIG. 4B, the animation control unit 120 may control the first and third objects 351 and 353 stored in the first circular queue 371 and the fifth object 355 stored in the second circular queue 372 to be rendered in a second frame.

Figure 5:
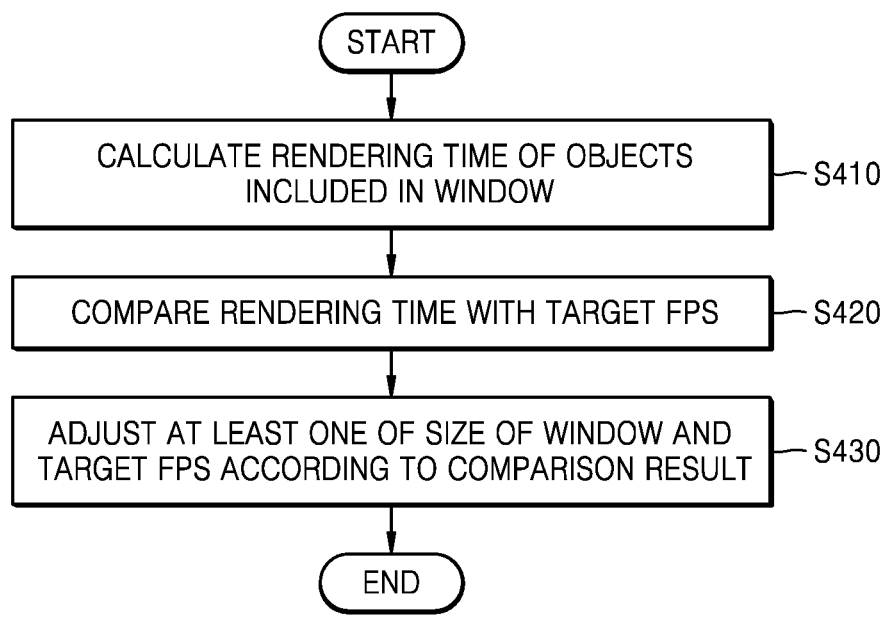
FIG. 5 illustrates a flowchart of a method of processing an animation, according to an exemplary embodiment of the inventive concept.

FIG. 5 illustrates a flowchart of a method of processing an animation, according to an exemplary embodiment of the inventive concept.

Referring to FIG. 5, in operation S410, the apparatus 100 calculates a rendering time of each of objects included in a current window.

A rendering time of objects may include a time of transmitting a rendering execution command to a rendering device (for example, the rendering module) and a time of calculating coordinates, matrices, and the like of the objects for rendering. The apparatus 100 may measure a time of calculating a matrix of each of the objects and set the measured time as a rendering time of each of the objects.

For example, the apparatus 100 may calculate the rendering time of each of the objects by measuring, using a performance function, a rendering start time point of the objects included in the current window and an end time point of a matrix calculation on each of the objects. The performance function is a function of providing a current time point, and by using the performance function, a time of a start point and a time of an end point may be measured, and an elapsed time may be calculated based on a difference therebetween.

In addition, the matrix of each of the objects may be calculated using an animation parameter of each of the objects. The animation parameter may indicate how many pixels are moved by an object, how much the object is magnified or reduced, or the like.

In operation S420, the apparatus 100 may compare a time obtained by summing the respective rendering times of the objects included in the current window with target FPS.

For example, the apparatus 100 may compare a rendering time of objects with a target time corresponding to the target FPS. In this case, the target time may be calculated as a reciprocal of the target FPS. For example, when the target FPS is equal to 60, the target time may be about 16 ms.

In operation S430, the apparatus 100 adjust at least one of a size of a window and the target FPS according to a comparison result.

Operation S430 will now be described in detail with reference to FIG. 6.

Figure 6:
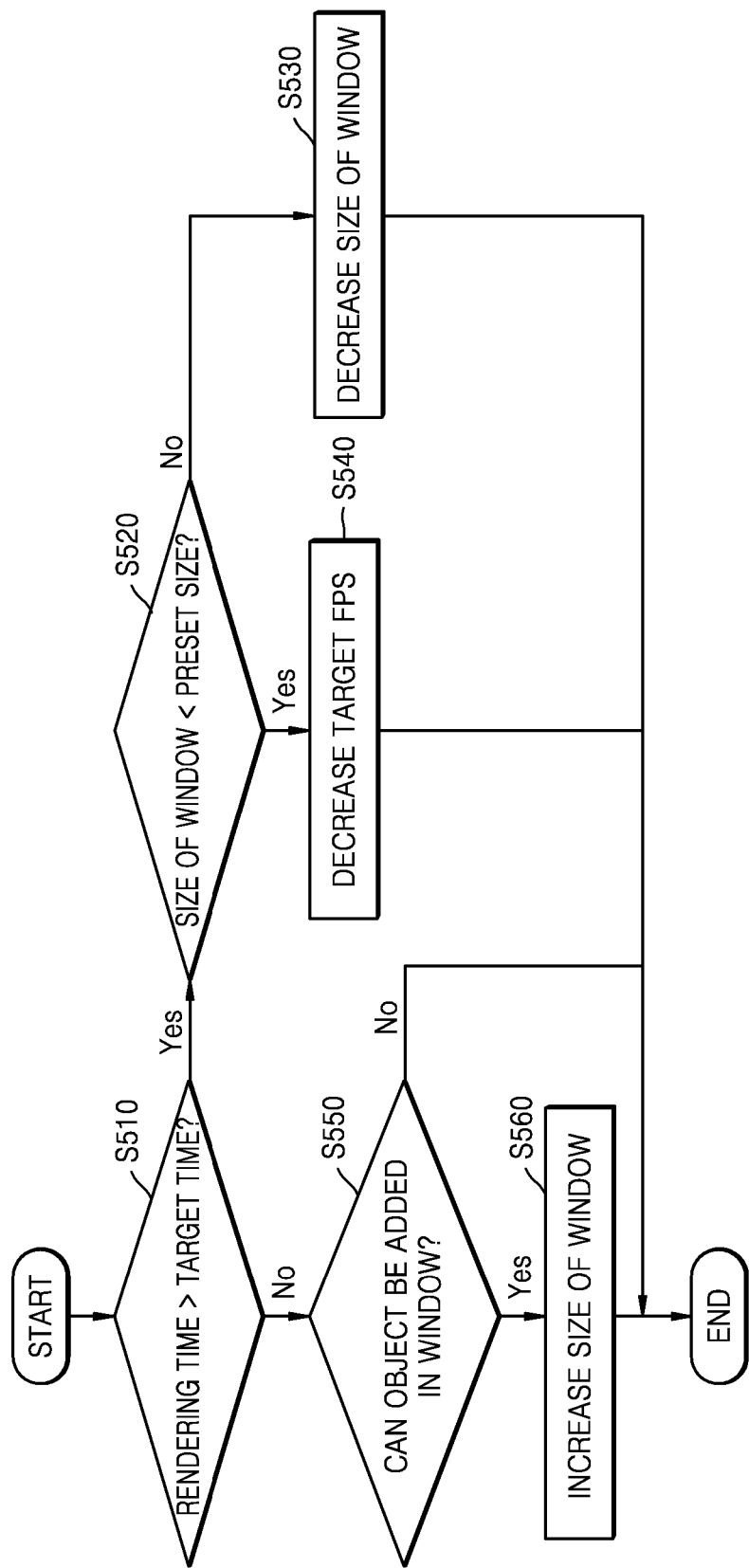
FIG. 6 illustrates a detailed flowchart of operations S420 and S430 of FIG. 5.

FIG. 6 illustrates a detailed flowchart of operations S420 and S430 of FIG. 5.

Operation S510, indicated in FIG. 6, may correspond to operation S420 indicated in FIG. 5, and operations S520 to S560, indicated in FIG. 6, may correspond to operation S430 indicated in FIG. 5.

Referring to FIG. 6, in operation S510, the apparatus 100 determines whether a time obtained by summing respective rendering times of objects included in a window is greater than a target time by comparing the time obtained by summing the rendering times with the target time.

In operation S520, if the summed time is greater than the target time, the apparatus 100 determines whether the size of the window is less than a preset size. In this case, the preset size may be determined based on the total number of objects included in content.

In operation S530, if the size of the window is equal to or greater than the preset size, the apparatus 100 decreases the size of the window to decrease the number of objects included in the window.

Otherwise, if the size of the window is less than the preset size, the apparatus 100 decreases the target FPS in operation S540. Accordingly, the target time increases.

If the summed time is less than or equal to the target time in operation S510, the apparatus 100 determines in operation S550 whether an object can be added to a current window.

For example, the apparatus 100 may determine whether a time obtained by summing respective rendering times of objects included in the current window is less than or equal to the target time even after a new object is added to the current window.

If the time obtained by summing the respective rendering times of the objects included in the current window is less than or equal to the target time even after the new object is added to the current window, the apparatus 100 increases the size of the window in operation S560. Accordingly, the apparatus 100 may increase the number of objects included in the current window.

Otherwise, if the time obtained by summing the respective rendering times of the objects included in the current window is greater than the target time after the new object is added to the current window, the apparatus 100 maintains the size of the current window.

The method of processing an animation, according to one or more exemplary embodiments of the inventive concept, may be implemented in a program instruction form executable through various computer or processing devices and recorded in a non-transitory computer-readable recording medium. The non-transitory computer-readable recording medium may include program instructions, data files, data structures, and the like, taken alone or in combination. The program instructions recorded in the non-transitory computer-readable recording medium may be particularly created and configured in accordance with the one or more exemplary embodiments or may be well-known and usable by one of ordinary skill in computer software. Examples of the non-transitory computer-readable recording medium are magnetic media such as hard disks, floppy disks, and magnetic tapes, optical media such as CD-ROMs and digital versatile discs (DVDs), magneto-optical media such as floptical disks, and hardware devices, such as read-only memory (ROM), random-access memory (RAM), flash memories, and the like, particularly configured to store and execute program instructions. The program instructions may include, for example, not only machine language codes made by a compiler but also high-language codes executable by a computer by using an interpreter or the like.

According to one or more of the exemplary embodiments, even when a certain number of objects are included in animation content, instances of skipping an animation may be minimized, thereby improving the quality of the animation.

In addition, even when an animation is processed using low-specification hardware, the perceived performance of the animation may be improved by heuristically adjusting the FPS of the animation and the number of objects to be rendered in one frame.

It should be understood that the exemplary embodiments described herein should be considered in a descriptive sense only and not for purposes of limitation. Descriptions of the features or aspects within each exemplary embodiment should typically be considered as being available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An apparatus for processing an animation, the apparatus comprising:
    at least one memory to store a plurality of objects included in an animation content; and
    at least one hardware-based processor that executes instructions stored in at least one memory to cause the following to be performed:
        determining a pre-adjusted amount of objects to be rendered in one frame based on a pre-adjusted target frames per second (FPS),
        comparing a rendering time of objects, which are selected from among the stored plurality of objects based on the pre-adjusted amount of objects, with a target time corresponding to the pre-adjusted target FPS,
        when the rendering time of objects is greater than the target time based on the comparing result, determining whether the pre-adjusted amount of objects is equal to or greater than a preset number,
        when the pre-adjusted amount of objects is equal to or greater than the preset number, decreasing the pre-adjusted amount of objects to be rendered in one frame, and
        when the pre-adjusted amount of objects is less than the preset number, decreasing the pre-adjusted target FPS,
    wherein the at least one hardware-based processor executes the stored instructions to:
        determine whether a size of a window including the pre-adjusted amount number of objects is equal to or greater than a preset size, and
        when the size of the window is equal to or greater than the preset size, change the size of the window such that the pre-adjusted number of objects included in the window is decreased.

2. The apparatus of claim 1, wherein the at least one hardware-based processor executes the stored instructions to increase the pre-adjusted number of separate objects to be rendered in the one frame if the calculated rendering is less than the target time corresponding to the pre-adjusted target FPS.

3. The apparatus of claim 1, wherein the at least one memory is further configured to store the plurality of separate objects in the at least one memory of the object storage to be rendered in a circular queue form.

4. The apparatus of claim 1, wherein the at least one hardware-based processor executes the stored instructions to measure a matrix calculation time for rendering with respect to each of the separate objects and to determine the measured time as a rendering time for each of the separate objects.

5. The apparatus of claim 1, further comprising a network interface unit configured to receive the animation content.

6. The apparatus of claim 1, further comprising a display unit configured to display a frame generated by rendering separate objects corresponding to the post-adjusted number of separate objects.

7. A method of processing an animation with an apparatus, the method comprising:
   storing instructions in at least one memory of the apparatus;
   executing the instructions stored in the at least one memory with at least one processor of the apparatus to cause the following to be performed:
   determining a pre-adjusted amount of objects to be rendered in one frame based on a pre-adjusted target frames per second (FPS),
   comparing a rendering time of objects, which are selected from among a plurality of objects included in an animation content based on the pre-adjusted amount of objects, with a target time corresponding to the pre-adjusted target FPS,
   when the rendering time of objects is greater than the target time based on the comparing result, determining whether the pre-adjusted amount of objects is equal to or greater than a preset number,
   when the pre-adjusted amount of objects is equal to or greater than the preset number, decreasing the pre-adjusted amount of objects to be rendered in one frame, and
   when the pre-adjusted amount of objects is less than the preset number, decreasing the pre-adjusted target FPS,
   wherein the determining whether the pre-adjusted amount of objects is equal to or greater than a preset number comprising:
   determining whether a size of a window including the pre-adjusted amount number of objects is equal to or greater than a preset size, and;
   when the size of the window is equal to or greater than the preset size,
   changing the size of the window such that the pre-adjusted number of objects included in the window is decreased.

8. The method of claim 7, further comprising:
   when the rendering time of separate objects is equal to or less than the target time based on the comparing result, increasing the pre-adjusted number of separate objects to be rendered in the one frame.

9. The method of claim 7, further comprising storing the plurality of separate objects included in the animation content, in a circular queue form.

10. The method of claim 7, further comprising displaying a frame generated by rendering objects included in the window having changed size.

11. The method of claim 7, further comprising calculating the rendering time of separate objects to be rendered in the one frame, and
   wherein the calculating of the rendering time of separate objects comprises:
   measuring a matrix calculation time for rendering each of the separate objects and determining the measured time as a rendering time of each of the separate objects.

12. The method of claim 7, further comprising receiving the animation content by the apparatus.

13. A non-transitory computer-readable medium having recorded thereon a computer-readable program for performing the method of claim 7.

* * * * *